(12) United States Patent
Shintani

(10) Patent No.: US 9,875,694 B2
(45) Date of Patent: Jan. 23, 2018

(54) SMOOTHING BRIGHTNESS TRANSITION DURING CHANNEL CHANGE

(71) Applicant: Sony Corporation, Tokyo (JP)

(72) Inventor: Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 310 days.

(21) Appl. No.: 14/855,567

(22) Filed: Sep. 16, 2015

(65) Prior Publication Data

US 2017/0076673 A1    Mar. 16, 2017

(51) Int. Cl.
*G09G 3/34* (2006.01)
*G06T 5/00* (2006.01)

(52) U.S. Cl.
CPC .......... *G09G 3/3406* (2013.01); *G06T 5/007* (2013.01); *G09G 2320/0233* (2013.01); *G09G 2320/0626* (2013.01); *G09G 2320/0653* (2013.01); *G09G 2360/144* (2013.01)

(58) Field of Classification Search
None
See application file for complete search history.

(56) References Cited

U.S. PATENT DOCUMENTS

| | | | |
|---|---|---|---|
| 6,483,245 B1 * | 11/2002 | Weindorf | G09G 3/00 315/149 |
| 8,319,699 B2 | 11/2012 | Clodfelter | |
| 9,294,748 B2 * | 3/2016 | Mori | G09G 3/20 |
| 9,299,292 B2 * | 3/2016 | Tanaka | G09G 3/3406 |
| 2008/0186393 A1 * | 8/2008 | Lee | G09G 3/3406 348/301 |
| 2009/0201320 A1 * | 8/2009 | Damberg | G09G 3/3426 345/694 |
| 2009/0267881 A1 * | 10/2009 | Takaki | G09G 3/2022 345/89 |
| 2009/0303391 A1 * | 12/2009 | Jung | G09G 3/2025 348/687 |
| 2010/0317408 A1 * | 12/2010 | Ferren | G06F 1/3265 455/566 |
| 2011/0227966 A1 * | 9/2011 | Mori | G09G 3/20 345/690 |
| 2013/0108055 A1 | 5/2013 | Hannas et al. | |
| 2014/0063075 A1 * | 3/2014 | Kim | G09G 3/3406 345/690 |
| 2014/0078054 A1 * | 3/2014 | Gardenfors | G06F 3/14 345/157 |
| 2015/0042890 A1 * | 2/2015 | Messmer | H04N 5/20 348/725 |

(Continued)

*Primary Examiner* — Kent Chang
*Assistant Examiner* — Nathan Brittingham
(74) *Attorney, Agent, or Firm* — John L. Rogitz

(57) ABSTRACT

First and second brightness metadata pertaining to respective first and second contents are accessed, and responsive to receiving a command to change presentation from the first content to the second content, a composite brightness is established using the first and second metadata. At least one of the contents using the composite brightness at a start time of a transition period. During the transition period, video is presented using a changing brightness that starts at the composite brightness at the start time of the transition period and ends at the second brightness at an end time of the transition period. Subsequent to the end time of the transition period, the second content is presented using the second metadata and not using the first metadata.

16 Claims, 4 Drawing Sheets

(56) References Cited

U.S. PATENT DOCUMENTS

| | | | |
|---|---|---|---|
| 2015/0054863 A1* | 2/2015 | Tanaka | G09G 3/3406 345/691 |
| 2016/0249009 A1* | 8/2016 | Messmer | H04N 5/20 |
| 2017/0025074 A1* | 1/2017 | Farrell | G06K 9/00711 |
| 2017/0048520 A1* | 2/2017 | Seifi | H04N 5/2355 |
| 2017/0206860 A1* | 7/2017 | Wu | G09G 5/10 |

\* cited by examiner

SMOOTHING BRIGHTNESS TRANSITION DURING CHANNEL CHANGE

TECHNICAL FIELD

The application relates generally to smoothing brightness transitions during content changes.

BACKGROUND

High dynamic range (HDR) is a video display technology that increases the luminance and color volume of a signal used to feed a display device.

SUMMARY

As understood herein, owing to HDR, when a user switches contents or programs, the brightness with which images are presented can change considerably more than it would have changed using standard dynamic range technology, which can cause viewer eye strain or other bothersome viewing experiences.

Accordingly, in an embodiment, a computer memory that is not a transitory signal includes instructions executable by a processor to access first and second brightness metadata pertaining to respective first and second contents, and responsive to receiving a command to change presentation from the first content to the second content, establish a composite brightness using the first and second metadata. The instructions are executable to present at least one of the contents using the composite brightness at a start time of a transition period. During the transition period, video is presented using a changing brightness feat starts at the composite brightness at the start time of the transition period and ends at the second brightness at an end time of the transition period. Subsequent to the end time of the transition period, the second content is presented using the second metadata and not using the first metadata.

In an example implementation, the presentation brightness changes continuously from the start time to the end time of the transition period. For instance, the presentation brightness can change continuously from the start time to the end time of the transition period such that the presentation brightness during the transition period is characterized by at least three successive, different brightnesses.

The composite brightness can be an average of the first and second brightness metadata. The first and second brightness metadata can include respective first and second peak and average brightness values, and the composite brightness cars include a composite peak brightness value derived from the first and second peak brightness values. In addition or alternatively, the composite brightness may include an average brightness value derived from the first and second average brightness values.

In some examples, the instructions are executable to present only the first content during the transition period and to change presentation from the first content to the second content at the end time of the transition period. In other examples, the instructions are executable to present only the second content during the transition period and to change presentation from the first content to the second content at the start time of the transition period. In still other examples, the instructions are executable to present both the first content and the second content during the transition period and to change presentation from the first content to the second content during the transition period, between the start time and the end time thereof.

In another aspect, an assembly includes a processor, a video display configured to be controlled by the processor, and a computer memory with instructions executable by the processor to receive a command to change presentation of video from a first content to a second content. Responsive to the content change command, video is presented on the display using a continuously variable brightness during a transition period.

In another aspect a method includes accessing first and second brightness metadata pertaining to respective first and second contents. Responsive to receiving a command to change presentation from the first content to the second content, a composite brightness is established using the first and second metadata. The method includes presenting at least one of the contents using the composite brightness at a start time of a transition period, and during the transition period, presenting video using a changing brightness that starts at the composite brightness at the start time of the transition period and ends at the second brightness at an end time of the transition period. Subsequent to the end time of the transition period, the second content is presented using the second metadata and not using the first metadata.

The details of the present application, both as to its structure and operation, can best be understood in reference to the accompanying drawings, in which like reference numerals refer to like parts, and in which:

DETAILED DESCRIPTION

Figure 1:
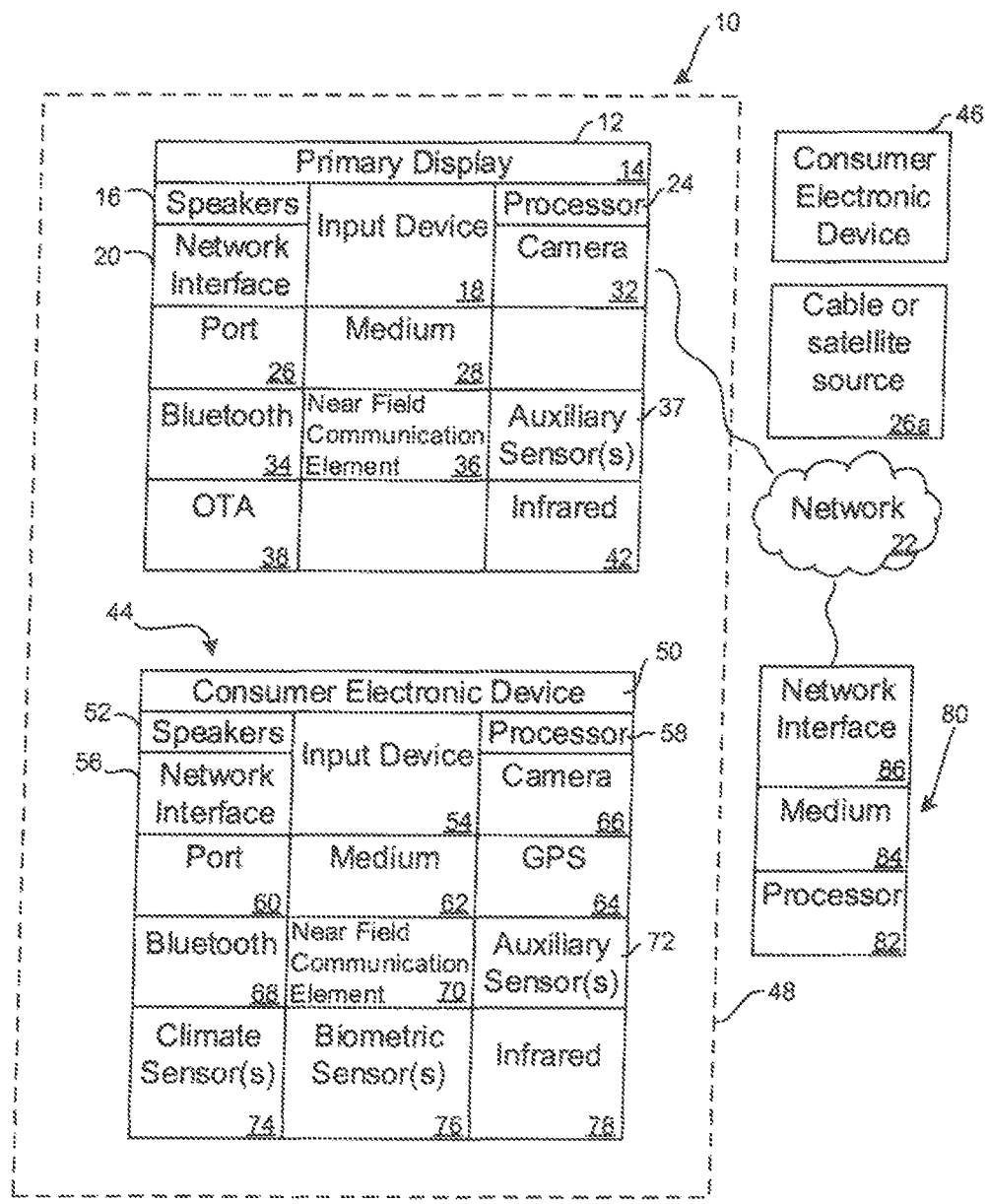
FIG. 1 is a block diagram of an example system including an example in accordance with present principles.

This disclosure relates generally to computer ecosystems including aspects of consumer electronics (CE) device networks. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system, having at least one of A, B, C") includes systems that have A alone, B alone, C alone, A, and B together, A and C together, B and C together, and/or A, B, and C together, etc.

Now specifically referring to FIG. 1, an example ecosystem 10 is shown, which may include one or more of the example devices mentioned above and described further below in accordance wife present principles. The first of the example devices included in the system 10 is a consumer electronics (CE) device configured as an example primary display device, and in the embodiment shown is an audio video display device (AVDD) 12 such as but not limited to an Internet-enabled TV with a TV tuner (equivalently, set top box controlling a TV). However, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interlaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such, as but not limited to a mesh network transceiver. It is to be understood that the processor 24 controls the AVDD 12 to undertake present principles, including the other elements of the AVDD 12 described herein, such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignation purposes described further below.

The AVDD 12 may further include one or more computer memories 28 such as disk-based or solid state storage that are not transitory signals, in some cases embodied in the chassis of the AVDD as standalone devices or as a personal video recording device (PVR) or video disk player either internal or external to the chassis of the AVDD for playing back AV programs or as removable memory media.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 3 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include an over-the-air TV broadcast port 38 for receiving OTH TV broadcasts providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles ail three devices 12, 44, 46 are assumed to be members of an entertainment network is, e.g., a home, or at least to be present in proximity to each other in a location such as a house. However, for present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or game controller, and accordingly may have one or more of the components described below. The second CE device 46 without limitation may be established by a video disk player such, as a Blu-ray player, a game console, and the like. The first CE device 44 may be a remote control (RC) for, e.g., issuing AV play and pause commands to the AVDD 12, or it may be a more sophisticated device such as a tablet computer, a game controller communicating via wired or wireless link with a game console implemented by the second CE device 46 and controlling video game presentation on the AVDD 12, a personal computer, a wireless telephone, etc.

Accordingly, the first CE device 44 may include one or more displays 50 that may be touch-enabled for receiving user input signals via touches on the display. The first CE device 44 may include one or more speakers 52 for outpacing audio in accordance with present principles, and at least one additional input device 34 such as e.g. an audio receiver/microphone for e.g. entering audible commands to the first CE device 44 to control the device 44. The example first CE device 44 may also include one or more network interfaces 36 for communication over the network 22 under control of one or more CE device processors 58. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 36 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device. 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVDD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interlace 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
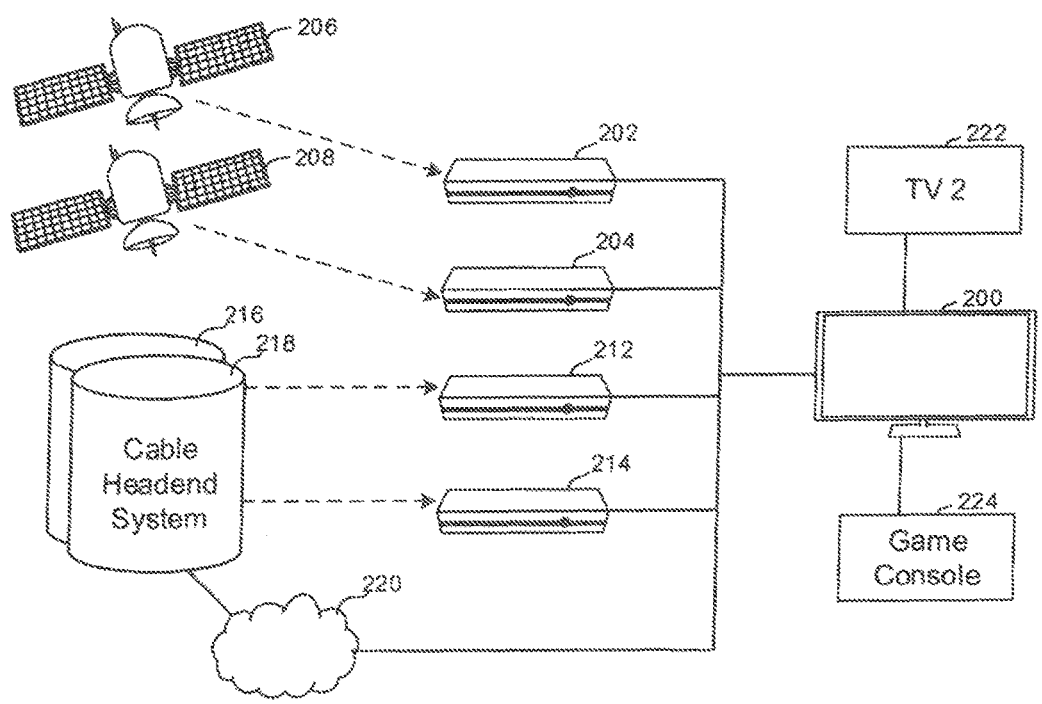
FIG. 2 is a block diagram, of another system that can use the components of FIG. 1.

Now referring to FIG. 2, an AVDD 200 that may incorporate some or all of the components of the AVDD 12 in FIG. 1 is connected to at least one gateway for receiving content, e.g., UHD content such as 4K or 8K content, from the gateway. In the example shown, the AVDD 200 is connected to first and second satellite gateways 202, 204, each of which may be configured as a satellite TV set top box for receiving satellite TV signals from respective satellite systems 206, 208 of respective satellite TV providers.

In addition or in lieu of satellite gateways, the AVDD 200 may receive content from one or more cable TV set top box-type gateways 210, 212, each of which receives content front a respective cable head end 214, 216. Note that a gateway may receive streaming content; over-the-top (OTT) content.

Yet again, instead of set-top box like gateways, the AVDD 200 may receive content from a cloud-based gateway 220. The cloud-based gateway 220 may reside in a network interface device that is local to the AVDD 200 (e.g., a modem of the AVDD 200) or it may reside in a remote Internet server that sends internet-sourced content to the AVDD 200. In any case, the AVDD 200 may receive multimedia content such as UHD content from the Internet through the cloud-based gateway 220. The gateways are computerized and thus may include appropriate components of any of the CE devices shown in FIG. 1.

In some embodiments, only a single set top box-type gateway may be provided using, e.g., the present assignee's remote viewing user interface (RVU) technology.

Tertiary devices may be connected, e.g., via Ethernet or universal serial bus (USB) or WiFi or other wired or wireless protocol to the AVDD 200 in a home network (that may be a mesh-type network) to receive content from the AVDD 200 according to principles herein. In the non-limiting example shown, a second TV 222 is connected to the AVDD 200 to receive content therefrom, as is a video game console 224. Additional devices may be connected to one or more tertiary devices to expand the network. The tertiary devices may include appropriate components of any of the CE devices shown in FIG. 1.

Assume that one of the displays described above, such as but not limited to the display of the AVDD 12 or 200, implements a technology such as but not limited to HDR. An HDR program typically is provided with static or dynamic metadata which may describe peak brightness (minimum and/or maximum), average brightness of the picture content, perceptual quantizer (PQ) curve, and gamma curve data. Present principles smooths the transition between programs and content viewing changes, such as, e.g., by changing TV channels or web video sources or other means, by essentially buffering, responsive to a channel or program change command, the current signal and the next signal the user has selected to tune to. The metadata from both signals is integrated/averaged to produce a composite brightness. The integration time can be tuned to provide a transition between programs or channels of greatly different brightnesses by preemptively using the next program's metadata such a brightness or luminance to reduce viewer eye strain daring program/channel change. Note that the metadata used may apply to content such as a TV program that can include interstitial content, e.g., commercials, and the same or different metadata can apply to the interstitial content.

Figure 3:
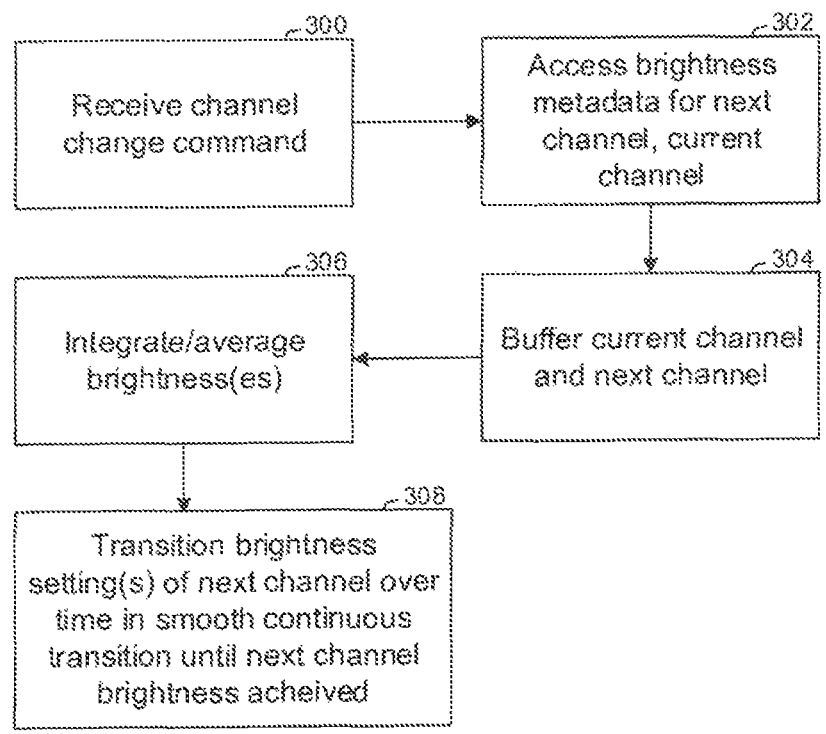
FIG. 3 is a flow chart of example logic.

FIG. 3 illustrates an example. Commencing at block 300, a command to change channel or program is received. At block 302, brightness metadata carried in the current signal and the signal of the program or channel commanded to be presented is accessed. At block 304, the current and next channel may be buffered. Proceeding to block 306, a composite brightness is established by integrating or averaging one or more of the brightness values represented in the respective metadata.

Example metadata brightnesses that may be used include "maximum frame average light lever", Maximum Content Light level, Max_Display_mastering_luminance value. One or more of these parameters may be used in the averaging algorithm.

In examples, the average brightness may be the algebraic average, i.e., average brightness equals one-half the sum of the two brightnesses being averaged. Average brightness may be the logarithmic average. For example, the average brightness may be the anti-log of one-half the sum of the logarithms of the two brightnesses being averaged.

Figure 5:
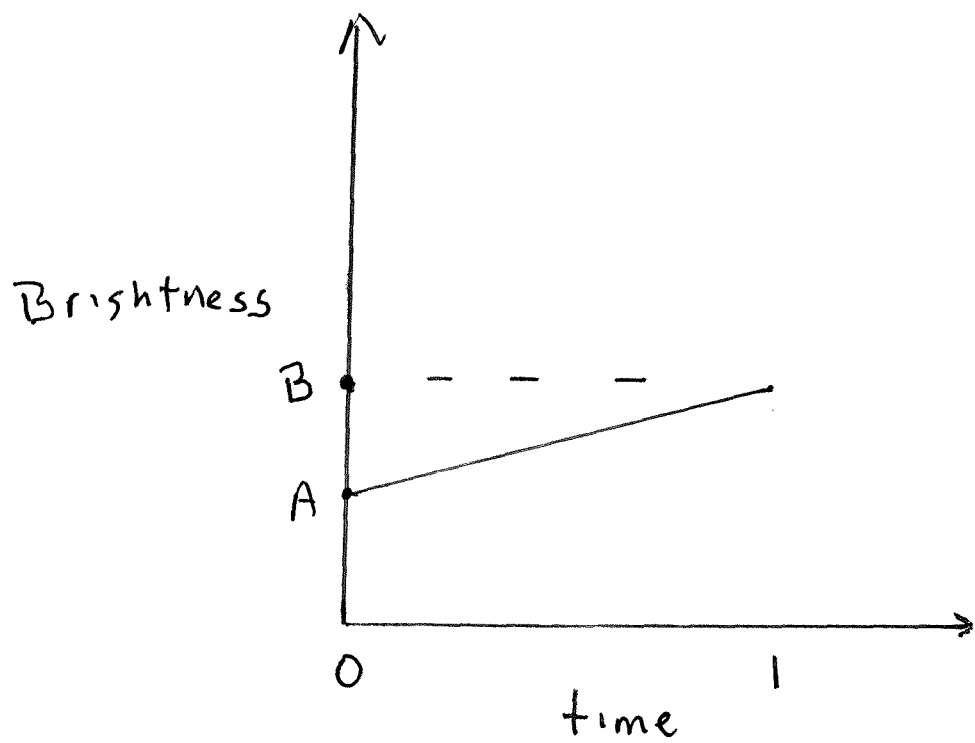
FIG. 5 is a graph showing a transition period.

Block 308 represents that at least one of the channels is presented using the composite brightness at a start time of a transition or integration period. During the transition period (FIG. 5), video is presented using a changing brightness that starts at the composite brightness ("A", FIG. 5) at the start time ("0", FIG. 5) of the transition period and ends at the second brightness ("B" FIG. 5) at an end time ("1", FIG. 5) of the transition period. Subsequent to the end time of the transition period, the second channel is presented using the second metadata and not using the first metadata.

In an example implementation, the presentation brightness changes continuously from the start time to the end time of the transition period. For instance, the presentation brightness can change continuously from the start time to the end time of the transition period such that the presentation brightness during the transition period is characterized by at least, three successive, different brightnesses.

The composite brightness can be an average of the first and second brightness metadata. The first and second brightness metadata can include respective first and second peak and average brightness values, and the composite brightness can include a composite peak brightness value derived from, the first and second peak brightness values. In addition or alternatively, the composite brightness may include an average brightness value derived from the first and second average brightness values. In any case, video is presented during the transition or integration period preferably using a continuously varying brightness that begins with the brightness of the current channel (prior to receiving the change command) and that transitions smoothly from the brightness of the current channel to the brightness of the next channel (the channel or program commanded to be tuned to).

In some examples, only the first channel is presented during the transition period, with the next channel or program being presented starting at the end time of the transition period. In other examples, only the next channel is presented during the transition period, with presentation from the first channel to the second channel being effected at the start time of the transition period. In still other examples, both the first channel and the second channel are presented during the transition period, meaning that presentation is changed from the first channel to the second channel during the transition period, between the start time and the end time.

Figure 4:
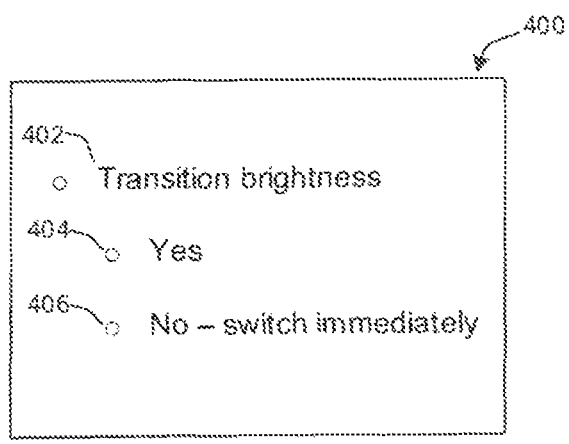
FIG. 4 is a screen shot of an example user interface (UI) allowing a viewer to select whether to implement brightness integration according to present principles.

FIG. 4 shows an example user interface (UI) 400 that may be presented on the device enabling a user to select the above-described brightness transition (announced at 402) or to decline this feature. An accept selector 404 is selectable to enable the logic of FIG. 3, while a decline selector 406 is selectable to disable the logic of FIG. 3.

The above methods may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD Rom or Flash drive. The software code instructions may alternatively be embodied in a transitory arrangement such as a radio or optical, signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. A computer memory that is not a transitory signal and that comprises instructions executable by at least one processor to:
   access first and second brightness metadata pertaining to respective s and second contents;
   responsive to receiving a command to change presentation from the first content to the second content, establish a composite brightness using the first and second metadata;
   present at least one of the contents using the composite brightness at a start time of a transition period;
   during the transition period, present video using a changing brightness that starts at the composite brightness at the start time of the transition period and ends at the second brightness at an end time of the transition period; and
   subsequent to the end time of the transition period, present the second content using the second metadata and not using the first metadata, wherein the first and second brightness metadata include respective first and second peak and average brightness values, and the composite brightness includes a composite peak brightness value derived from the first and second peak brightness values.

2. The computer memory of claim 1, wherein the presentation brightness changes continuously from the start time to the end time of the transition period.

3. The computer memory of claim 2, wherein the presentation brightness changes continuously from the start time to the end time of the transition period such that the presentation brightness during the transition period is characterized by at least three successive, different brightnesses.

4. A computer memory that is not a transitory signal and that comprises instructions executable by at least one processor to:
   access first and second brightness metadata pertaining to respective first and second contents;
   responsive to receiving a command to change presentation from the first content to the second content, establish a composite brightness using the first and second metadata;
   present at least one of the contents using the composite brightness at a start time transition period;
   during the transition period, present video using a changing brightness that starts at the composite brightness at the start time of the transition period and ends at the second brightness at an end time of the transition period; and
   subsequent to the end time of the transition period, present the second content using the second metadata and not using the first metadata, wherein the composite brightness is an average of the first and second brightness metadata.

5. A computer memory that is not a transitory signal and that comprises instructions executable by at least one processor to:
   access first and second brightness metadata pertaining to respective first and second contents;
   responsive to receiving a command to change presentation from the first content to the second content, establish a composite brightness using the first and second metadata;
   present at least one of the contents using the composite brightness at a start time of a transition period;
   during the transition period, present video using a changing brightness that starts at the composite brightness at the start time of the transition period and ends at the second brightness at an end time of the transition period; and
   subsequent to the end time of the transition period, present the second content using the second metadata and not using the first metadata, wherein the first and second brightness metadata include respective first and second peak and average brightness values, and the composite brightness includes an average brightness value derived from the first and second average brightness values, wherein the composite brightness further includes a composite peak brightness value derived from the first and second peak brightness values.

6. The computer memory of claim 1, wherein the instructions are executable to present only the first content during the transition period and to change presentation from the first content to the second content at the end time of the transition period.

7. The computer memory of claim 1, wherein the instructions are executable to present only the second content during the transition period and to change presentation from the first content to the second content at the start time of the transition period.

8. The computer memory of claim 1, wherein the instructions are executable to present both the first content and the second content during the transition period and to change presentation from the first content to the second content during the transition period, between the start time and the end time thereof.

9. An assembly, comprising:
   at least one processor;

at least one video display configured to be controlled by the processor; and at least one computer memory with instructions executable by the at least one processor to:

receive a command to change presentation of video from a first content to a second content;

responsive to the content change command, present video on the display using a continuously variable brightness during a transition period;

access first and second brightness metadata in respective first and second contents;

responsive to receiving the command, establish a composite brightness using the first and second metadata;

present at least one of the contents using the composite brightness at a start time of the transition period;

during the transition period, present video using the continuously variable brightness that starts at the composite brightness at the start time of the transition period and ends at the second brightness at an end time of the transition period; and subsequent to the end time of the transition period, present the second content using the second metadata and not using the first metadata, wherein the first and second brightness metadata include respective first and second peak and average brightness values, and the composite brightness includes a composite peak brightness value derived from the first and second peak brightness values.

10. The assembly of claim 9, wherein the composite brightness is an average of the first and second brightness metadata.

11. An assembly, comprising:

at least one processor;

at least one video display configured to be controlled by the processor; and at least one computer memory with instructions executable by the at least one processor to:

receive a command to change presentation of video from a first content to a second content;

access first and second brightness metadata in respective first and second contents;

responsive to receiving the command to change presentation, establish a composite brightness using the first and second metadata;

present at least one of the contents using the composite brightness at a start time of the transition period;

during the transition period, present video using the continuously variable brightness that starts at the composite brightness at the start time of the transition period and ends at the second brightness at an end time of the transition period; and subsequent to the end time of the transition period, present the second content using the second metadata and not using the first metadata, wherein the first and second brightness metadata include respective first and second peak and average brightness values, and the composite brightness includes an average brightness value derived from the first and second average brightness values.

12. The assembly of claim 11, wherein the composite brightness further includes a composite peak brightness value derived from the first and second peak brightness values.

13. An assembly, comprising:

at least one processor;

at least one video display configured to be controlled by the processor; and at least one computer memory with instructions executable by the at least one processor to:

receive a command to change presentation of video from a first content to a second content;

responsive to the content change command, present video on the display using a continuously variable brightness during a transition period, wherein the instructions are executable to present only the first content during the transition period and to change presentation from the first content to the second content at the end time of the transition period.

14. An assembly, comprising:

at least one processor;

at least one video display configured to be controlled by the processor; and at least one computer memory with instructions executable by the at least one processor to:

receive a command to change presentation of video from a first content to a second content;

responsive to the content change command, present video on the display using a continuously variable brightness during a transition period, wherein the instructions are executable to present only the second content during the transition period and to change presentation from the first content to the second content at the start time of the transition period.

15. The assembly of claim 9, wherein the instructions are curable to present both the first content and the second content during the transition period and to change presentation from the first content to the second content during the transition period, between the start time and the end time thereof.

16. A method, comprising:

accessing first and second brightness metadata pertaining to respective first and second contents;

responsive to receiving a command to change presentation from the first content to the second content, establishing a composite brightness using the first and second metadata;

presenting at least one of the contents using the composite brightness at a start time of a transition period;

during the transition period, presenting video using a changing brightness that starts at the composite brightness at the start time of the transition period and ends at the second brightness at an end time of the transition period; and subsequent to the end time of the transition period, presenting the second content using the second metadata and not using the first metadata.

* * * * *